Oct. 6, 1970 P. R. BRINSON ET AL 3,532,338

DOCUMENT HANDLING DEVICE

Filed April 12, 1968

INVENTOR.
PAUL R. BRINSON

BY

Robert W. Lahtinen

ATTORNEY 3,532,338

DOCUMENT HANDLING DEVICE

Paul R. Brinson, Rochester, and Howard A. Wayne, Olmsted County, Minn., assignors to International Business Machines Corporation, Armonk, N.Y., a corporation of New York

Filed Apr. 12, 1968, Ser. No. 720,981
Int. Cl. B65h *9/06*
U.S. Cl. 271—53 3 Claims

ABSTRACT OF THE DISCLOSURE

A document handling apparatus is shown wherein a document is transported through a machine by selective sequential operation of idler rolls to compress the document against cooperating confronting drive rolls. Documents are aligned along the guideway by concurrently driving the document with one driven feed roll while the document potentiates a biasing means urging the document in the opposite direction. When the driven roll is released from driving engagement with the document, the potentiated biasing means remains operative to arrest the document and thereafter drive the document in the opposite direction to bring the trailing edge into engagement with an alignment surface. The biasing means further serves to retain the document in the aligned position until released upon the assumption of document control by another document driving mechanism.

BACKGROUND OF THE INVENTION

In document handling machines such as card punches, it is necessary to transport a document along a guideway or arrest its travel at a pre-punch station and precisely align the document for the first punch cycle before transferring control to the document drive mechanism which will incrementally move the card through the punch station. It is not only necessary that the document be stopped and properly aligned, but also that the positioning be maintained without permitting the document to creep until the work cycle of the punch mechanism is initiated. In the past, this has often been done using patters and cam controlled card pushers. These mechanisms are often complex and require precise adjustment to assure that proper card registration is maintained at the initiation of the punching operation.

SUMMARY OF THE INVENTION

The document positioning and aligning device of this invention maintains a card or document under continuous uninterrupted positive control from the inception of serial transport into, through and during ejection from the work station. Further, the card is positively aligned at the initial work position and securely biased against the alignment surface to prevent creepage. This action is accomplished by a rearwardly biased align roll which moves the card into a predetermined location and retains the card in positive contact with the alignment surface until control is taken by the incremental drive at the work station. Accomplishment of the function without the use of such devices as cam controlled card pushers and patters not only reduces the amount of structure necessary to perform the function and lowers the cost but also increases the reliability and reduces maintenance.

The structure could be modified by skewing the alignment drive roll and the align pressure roll to cause the card to move in a desired direction. A further variation could be accomplished by forming the alignment drive roll as a partial roll to thereby limit the amount of energy that could be stored in the spring.

It is an object of this invention to provide an improved card transport and alignment device.

It is a further object of this invention to achieve and maintain a precision alignment of a document within a machine until the transport device associated with a work station assumes control of the document.

It is also an object of this invention to provide an alignment device with fewer parts, greater reliability and lesser maintenance.

The foregoing and other objects, features and advantages of the invention will be apparent from the following more particular description of a preferred embodiment of the invention, as illustrated in the accompanying drawings.

DETAIL DESCRIPTION

Figure 1:
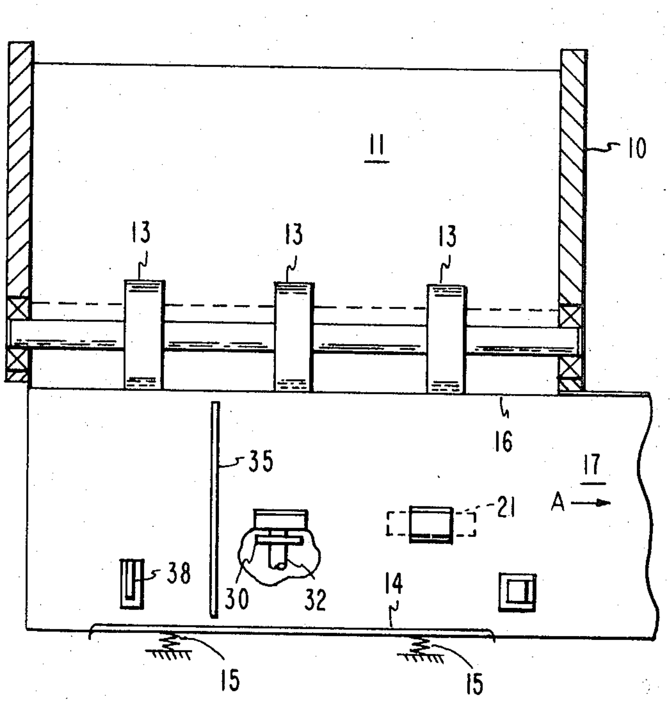
FIG. 1 is a partial schematic plan view partly in section and partly broken away of a data card transport device utilizing the alignment mechanism of this invention.

Referring to the drawings, FIG. 1 shows a plan view of the hopper 10, from which cards are fed in parallel relation one at a time from the bottom of the deck 11 (by means not shown) into a card throat. The separated card is then propelled by the drive rolls 13 to a cornering station to be oriented for serial feeding through the machine in the direction of arrow A. As a card is fed in parallel relation from hopper 10, the leading edge is received against the rail 14 which is supported by springs 15 to yield upon impact and thereafter drive the card in the opposite direction into abutting relation with the shoulder surface 16 to confine the card on the path or guideway 17 between rail 14 and shoulder 16.

Figure 2:
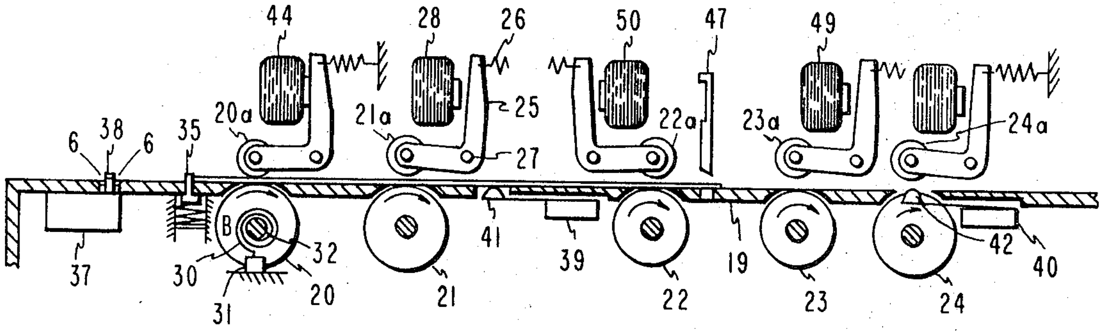
FIG. 2 is a partial schematic sectional side elevation of a serial card punch machine utilizing the alignment device of the present invention.

As seen in FIG. 2, the guideway povides a card bed 19 upon which a card is supported during transport and processing within the machine. A series of drive rolls 20 through 24 are rotatably supported beneath the bed 19 and project through bed openings into the card path or guideway 17. Confronting each drive roll and aligned therewith is an idler roll mounted on a bell crank for movement toward and away from the cooperating drive roll for selectively placing a card in the guideway under the control of such drive roll. As shown, each of the idler rolls is urged toward an operating position by an electro magnet and biased away from the operative condition by a spring. For example, bell crank 25 pivoted about pin 277 has mounted thereon an idler roll 21*a* and is biased away from drive roll 21 by spring 26 and is pivotable to move idler roll 21*a* toward drive roll 21 by actuation of an electro-magnet 28. Drive rolls 21 and 24 are continuously driven at a peripheral speed which propels a card moving in engagement therewith at the machine transport speed. Rolls 22 and 23 are incrementing rolls which are driven in unison although the pressure rolls 22*a* and 23*a* may be separately actuated and provide for a period of dwell to facilitate punch operation intermediate each increment of motion.

Roll 20 is rotatably mounted but not driven. A helical spring 30 has one end secured at 31, a position which is stationary with respect to card bed 19 and the opposite end secured to the shaft 32 which rotates in unison with drive roll 21. Accordingly, when the idler roll 20*a* is actuated and a card is being driven between idler roll 21*a* and drive roll 21 to move roll 20 in the direction of arrow B, spring 30 is potentiated to provide a biasing force in the direction opposite that indicated by arrow B. A rear align bar 35 is mounted in a slot in the card bed 19 and urged to an upward projecting position, wherein an aligning surface is presented above the surface of the card guideway. A switch 37 has an actuating arm 38 which projects through an aperture in card bed 19 and senses the presence of an overlying card. Similarly, switches 39 and 40 have actuators 41 and 42 which project through card bed 19 to sense the presence of a card immediately above the respective actuator element.

A card received at the cornering station overlies the switch actuator 38, depresses the rear align bar 35 and is disposed beneath the pressure rolls 20*a* and 21*a* as it overlies the drive rolls 20 and 21. At this time, the electro magnetic members 44 and 28 are actuated, causing idler rolls 20*a* and 21*a* to compress the underlying card against the drive rolls 20 and 21. The continuously driven roll 21 initiates serial motion of the card at transport speed while concurrently the pressure roll 20*a* being urged against the roll 20 causes spring 30 to be potentiated generating a biasing force in the direction opposite arrow B. When the switch actuator 38 senses that the trailing edge of the card has passed, the switch 37 causes the electro-magnet 28 to be de-energized releasing pressure roll 21*a* following which the card continues to travel serially along the guideway as the kinetic energy is being overcome by the influence of spring 30. The biasing force of spring 30 halts the progress of the card after the trailing edge of the card has passed the rear align bar 35, permitting the rear align bar to move upwardly and before the card has progressed beyond the influence of drive roll 20. Thereupon the spring 30 drives the roll 20 and the engaged card in the opposite direction and into abutting relation against the rear of the rear align bar (as shown in FIG. 2).

The rear align bar is positioned in such manner that a card held against the alignment surface is retained with the first column of the card adjoining the leading edge properly positioned beneath the punch elements 47. The biasing means provided by spring 30 positively retains the card against the align bar 35 and prevents creeping of the card prior to the assumption of control by the incrementing rolls 22, 23 which cause the card to progress incrementally through the punch station. During the first punch cycle, the pressure roll 22*a* is urged towards the incrementing roll 22 by actuation of the electromagnet 50 and the electro-magnet 44 is de-activated to permit the pressure roll 20*a* to move away from an operative relationship with the spring biased drive roll 20. Following a predetermined number of cycles which would indicate that the card has progressed to a position intermediate the incrementing roll 23 and idler roll 23*a* the electro-magnet 49 is energized to urge idler roll 23*a* toward the incrementing roll 23. When the punching operation has been completed, the drive rolls 21 and 24 are utilized to transport the card away from the punch station. If only a relatively few columns of the card are being punched and the operation is completed before the card reaches a position intermediate drive roll 24 and pressure roll 24*a*, the pressure roll 21*a* is actuated causing the card to be transported under the influence of drive roll 21 until it reaches a position overlying drive roll 24, whereupon the pressure roll 24*a* is actuated to cause drive roll 24 to propel the card from the station.

While the invention has been particularly shown and described with reference to a preferred embodiment thereof, it will be understood that various changes in form and details may be made therein without departing from the spirit and scope of the invention.

What is claimed is:

1. Document handling apparatus comprising:

means defining a document path;

means for delivering a document to a first position;

first selectively operable means for moving a document in one direction along said path and engageable with said document in said first position;

said first selectively operable means including a first drive roll extending into said guideway and a pivotally supported first idler roll in alignment with said drive roll;

second selectively operable means for biasing said document in the opposite of said one direction and engageable with said document in said first position;

said second selectively operable means including a second drive roll extending into said guideway and a second idler roll pivotally supported for movement toward and away from said second drive roll and yieldable first biasing means urging said second drive roll toward one rotational position, whereby upon actuation of both said first and second selectively operable means with a document in said first position said first drive roll means said document in said one position and said yieldable biasing means is potentiated to provide a biasing force in the opposite of said one direction, an alignment surface in said guideway and facing in said one direction;

control means for actuating said first and second selectively operable means when said document is in first position and thereafter de-activating said first selectively operable means to permit said second selectively operable means to urge the trailing edge of said document against said alignment surface;

a bed plate which forms a portion of said card path;

a transverse rear align stop, presenting said alignment surface, mounted in a recess in said bed plate for vertical reciprocating motion with respect thereto; and second biasing means urging said rear align stop toward an upward position whereat said alignment surface carried thereby projects into said document path.

2. The document handling apparatus of claim 1 wherein said alignment surface, said first drive roll and said second drive roll are disposed along said document path in sequence in the direction of document travel when driven by said first drive roll and said control means provides concurrent actuation of said first and second idler rolls when a document is in said first position and terminates actuation of said first idler roll prior to the passage of the rear edge of said document beyond said alignment surface, whereby said first biasing means overcomes the kinetic energy of said document following passage of said document rear edge beyond said alignment surface.

3. The document handling apparatus of claim 2 further comprising:

a document processing station wherein said document when restrained by said second selectively operable means with the rear edge of said document abutting said alignment surface presents the first portion of said document to be processed in the initial alignment position of said processing station.

References Cited

UNITED STATES PATENTS

| | | | |
|---|---|---|---|
| 1,193,693 | 8/1916 | Ielfield | 271—36 |
| 2,359,856 | 10/1944 | Morse | 271—36 |
| 2,793,035 | 5/1957 | Wroblewski | 271—57 |
| 3,026,994 | 3/1962 | Stoothoff | 271—36 |
| 3,108,801 | 10/1963 | Van Dalen | 271—57 |
| 3,168,309 | 2/1965 | Schopp et al. | 271—58 |
| 3,178,175 | 4/1965 | Hohmann | 271—57 |
| 3,287,015 | 11/1966 | Preuss et al. | 271—57 |
| 3,433,475 | 3/1969 | Asada | 271—57 |

EVON C. BLUNK, Primary Examiner

W. S. CARSON, Assistant Examiner

U.S. Cl. X.R.

271—57, 58